United States Patent [19]
Bunting
[11] 3,800,200
[45] Mar. 26, 1974

[54] MOTOR SPEED CONTROL DEVICE

[76] Inventor: Eugene N. Bunting, P.O. Box 337, Freeport, Bahamas

[22] Filed: June 12, 1972
[21] Appl. No.: 263,756

[52] U.S. Cl. 318/228, 318/314
[51] Int. Cl. H02p 5/28
[58] Field of Search 318/85, 228, 314, 318

[56] References Cited

UNITED STATES PATENTS

| | | | |
|---|---|---|---|
| 2,476,873 | 7/1949 | Jeffers | 318/314 |
| 2,533,473 | 12/1950 | Kille | 318/85 |
| 1,963,296 | 6/1934 | Purington | 318/314 |

*Primary Examiner*—Bernard A. Gilheany
*Assistant Examiner*—Thomas Langer

[57] ABSTRACT

A system for accurately and quickly controlling the speed of a non-synchronous motor used for driving a magnetic tape having a known frequency signal recorded thereon. The frequency signal recorded on the tape is mixed with the reference frequency to produce a control signal related to the phase relation between the mixed frequency signals. The control signal is used to alternate the voltage amplitude of a 60 cycle current power supply to an AC non-synchronous induction motor for driving the tape. The power supply alternates between a high and a low voltage in relation to the phase relation between the mixed signals in a manner which alters the speed of the induction motor to almost instantaneously produce synchronism of the tape recorded frequency with the reference frequency. In addition to providing accurate reproduction of tape recorded frequencies, independent of factors such as tape stretch or shrinkage, and mechanical slippage, the system automatically phases the recorded tape pulses to the reference pulse to produce a situation similar to the phase relationship between a synchronous induction motor and the AC power frequency which is driving it.

3 Claims, 4 Drawing Figures

MOTOR SPEED CONTROL DEVICE

BACKGROUND OF THE INVENTION

1. Field of the Invention

The present invention relates to motor speed control systems and, more particularly, relates to apparatus for controlling the speed of magnetic tape recorders.

2. Description of the Prior Art

In the field of magnetic tape recording for motion pictures, it is necessary to play back the recorded information at a speed which will be in step, frame for frame, with the picture material. In such tape recorders, of the non-sprocket type, the stretch associated with the tape after information has been recorded on the tape, tape slippage and other mechanical tolerances affecting irregularities in the movement of the tape during playback can cause the information on the tape to lose synchronism with the picture material. For example, in applications where a non-sprocketed magnetic tape machine is playing back the sound track for a motion picture being projected with a sprocketed machine running synchronous to the line frequency, over a period of operating time, such as 10 minutes, an accumulation of error amounting to one second of tape, or more, may result, which can be seen by the viewer as a gain or loss of 24 frames, or more, of picture film during this time. In some cases, this can be evidenced by the movement of a person's lips on the screen, with the sound being out of synchronism with the picture.

Different types of motor speed control and synchronizing devices have been employed for regulating the speed of magnetic tape recorders. In general, many of the conventional devices are slow in providing the speed correction required to bring the tape and its recorded information into synchronism with the line frequency. Also, many of the conventional devices require complex error detection and motor control circuits which are expensive from the standpoint of both manufacturing and maintenance cost. Conventional magnetic tape recorders are commonly driven by synchronous motors or DC servo motors. In one type of magnetic tape recorder, phase detection circuits are used to derive voltages from a difference in phase relationship betwen the reproduced frequency and standard frequencies which serve to modify the frequency of an alternating current supplied to a synchronous drive motor or a servo motor in accordance with the variations in frequency. Here, the speed and accuracy with which the tape recorded frequency is brought into synchronism with the line frequency or a standard frequency is dependent in part upon the frequencies of the currents used for driving the motors. In such magnetic tape recorders, there still exists a need for a system which more quickly corrects the irregularities in tape motion and errors caused by tape stretching and, when interlocking a sprocketed machine with a non-sprocketed one, the stop and start movement of the tape.

SUMMARY OF THE INVENTION

It is an object of the present invention to provide accurate reproduction of tape recorded frequencies.

It is another object to provide accurate reproduction of tape recorded frequencies, independent of such factors as tape stretch or shrinkage due to mechanical stress or variations in temperature or humidity, and also independent of tape slippage with respect to the tape drive mechanism, and variations due to frequency in the current source for the drive motor.

It is another object to provide a system which corrects for slight variations in frequency and phase between a tape recorded frequency signal and a reference frequency signal and which provides a correction signal to the drive motor for correcting such variations.

It is another object to provide a system which more quickly corrects an out of phase condition between a tape recorded frequency signal and a reference frequency signal.

It is another object to provide a motor speed control system wherein the drive motor is not synchronous but rather operates at a speed which is related to the differences in phase and frequency between a frequency signal recorded on a tape and a reference frequency.

It is a further object to provide a motor speed control system which is both simple and efficient in its circuitry and operation.

These and other objects, which will become apparent from the detailed description and claims to follow, are achieved by the present invention which provides a system for accurately and quickly controlling the speed of the motor used for driving a tape having known frequency signals recorded thereon. The frequency signals recorded on the tape are mixed with a reference frequency to produce a control signal related to the phase-relation between the mixed frequency signals. The control signal is used to alternate the amplitude of an AC voltage from a power supply into an AC non-synchronous induction motor for driving the tape. The power supply voltages alternate in direct ratio to the phase relation between the mixed signals in a manner which alters the speed of the induction drive motor to instantaneously produce synchronism of the tape recorded frequency with the reference frequency. Thus, depending on the frequency mixed signal, the AC supply voltage to the induction drive motor will vary in a manner which adjusts the speed of such motor to produce synchronism of the tape recorded frequency with the reference frequency. In one embodiment, the pre-recorded frequency signal is a 60 cycle line frequency which is mixed with a 60 cycle reference line frequency to produce an alternating output signal indicative of the phase difference between the two signal frequencies. The frequency mixed signal is half-wave rectified and then used as a control signal for operating a switching gate. This half-wave rectified control signal is a pulsating voltage which controls the operation of the gate for switching a high voltage line into a relatively low voltage line originating from the same 60 cycle voltage supply. The pulsating high voltage line and the low voltage line are combined to produce the supply voltage to the induction drive motor.

The gate is constituted by a DC servo motor having a micro switch being vibrated between a closed position in which the high voltage supply line is connected to the low voltage line into the drive motor, and an open position in which the high voltage line is open and only the low voltage line is connected to the induction drive motor. The DC servo motor fluctuates at the 60 cycle line frequency, but the duration of the cycle in which the high voltage line is switched into the low voltage line varies in accordance with the frequency mixed control signal. Under the ordinary operating conditions, there are injections of high voltage into the low voltage line occurring during portions of several ones of a given number of voltage cycles. However, in extreme cases, if the frequency signal from the tape is 180° out of phase with the line frequency, then such signals, when mixed, will cancel each other out, and, consequently, the DC servo motor will not be activated sufficiently and the micro switch will remain at either the closed or open position. This condition will cause either a steady high or low voltage to be applied to the induction drive motor which will either speed up or slow down such motor until the tape is driven at a speed at which the recorded frequency is synchronous with the line frequency. If the tape is driven too slow, then the frequency mixed signal will cause the micro switch to be closed during a greater number of cycles, thereby increasing the time during which the high voltage line is combined with the low voltage line. In this case, the average voltage applied to the induction drive motor increases to thereby speed up the tape until its recorded frequency signal is synchronous with the line frequency. On the other hand, if the tape is running too fast, the frequency mixed signal causes the micro switch to be closed during a smaller number of cycles, thereby reducing the average voltage applied to the induction drive motor. Here, the induction drive motor will slow down to a speed in which the recorded frequency signal on the tape is synchronous with the line frequency.

In the motor speed control device according to the present invention, alternation between the low voltage and the high voltage induces the non-synchronous induction drive motor to react in a manner whereby its rotation, while appearing to be smooth due to the momentum of the rotor is, in fact, pulsing in phase and in synchronism with the tape pulses. The high voltage provides pulsating strength at each instant of insertion thus causing the drive motor to phase with the line frequency, regardless of the position of the poles on the rotor and at the same time causing the recorded tape pulses to phase with the line frequency as well. The fact that the system contains a reserve power capacity far in excess of the power necessary to drive the drive motor at a synchronous speed accounts for the reason why the system reacts instantly in achieving synchronism between the tape frequency and the line frequency.

In another embodiment, the gate is constituted by a thyristor circuit for switching the high voltage line in accordance with the control signals derived by mixing recorded tape frequency signal with a reference frequency. Here, the two input frequencies are applied to the input of a common transformer, the output of which is used to control a thyristor switching circuit. Operation of the thyristors causes the high voltage line to be connected to the relatively low voltage line being continuously supplied to the induction motor for driving the tape. Thus, the control AC supply voltage to the induction drive motor varies each cycle in accordance with the phase relation of the two mixed frequency signals, which in turn serve to control the supply of the higher amplitude AC signal to the induction drive motor, thereby controlling the tape speed.

DESCRIPTION OF THE PREFERRED EMBODIMENTS

Figures 1, 2:
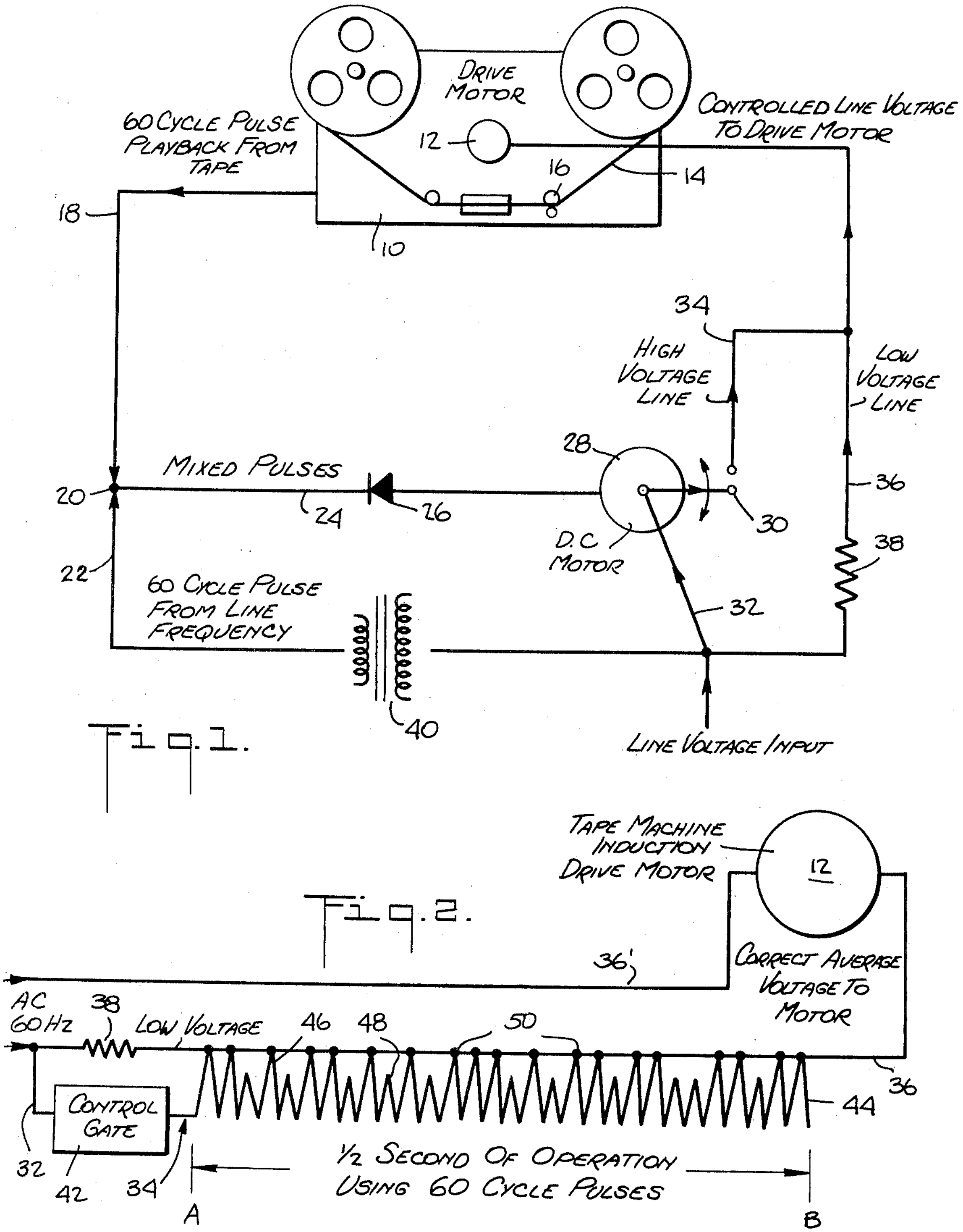
FIG. 1 shows an electromechanical circuit arrangement for the motor speed control device, illustrative of the invention.
FIG. 2 shows an electric signal diagram depicting the combined high and low voltage alternating signal supplied to the induction drive motor.

Referring to FIG. 1, a tape recorder 10 includes a non-synchronous induction motor 12 for driving a magnetic tape 14 via one or more capstans 16. The tape 14 is pre-recorded with a frequency signal, such as a 60 cycle line frequency. Electronic playback equipment, not shown, is included in the tape recorder 10 and comprises conventional tape sensing, signal detection and amplification circuits. Accordingly, the recorded frequency signal from the tape appears on an output line 18. This signal on line 18 is mixed at circuit juncture 20 with a 60 cycle line reference frequency on line 22 to produce an alternating output signal indicative of the phase differences between the two input frequencies on lines 18 and 22. It is noted that the two input frequencies on lines 18 and 22 are mixed at 20 by a circuit which consists simply of a connection between the two lines 18 and 22. Of course, other mixing circuits may be employed to provide a resultant output signal on line 24 which represents the phase difference between the tape frequency on line 18 and the reference frequency on line 22.

In other words, the mixing of these two input frequencies on lines 18 and 22 produces a low 60 cycle voltage on line 24 having an amplitude which is in direct relation to the phase difference between the two input frequencies on lines 18 and 22. If the input frequencies on lines 18 and 22 are completely in phase, then this phase relationship will produce the maximum AC voltage on the line 24 because both frequencies are alternating in the same direction at the same time. On the other hand, when the two input frequencies on lines 18 and 22 are 180° out of phase with each other, then, assuming the signals are of equal amplitude, the signals will cancel each other so that substantially no voltage is produced on line 24.

If the tape recorded frequency on line 18 is not identical in phase with the line reference frequency on line 22, the resultant output signal on line 24 will be a variable voltage which is not in symmetrical sinusoidal wave form. This out-of-phase combined signal on line 24 is half-wave rectified by a diode 26 to provide a rectified control signal which is applied to a DC servo motor 28. The DC servo motor normally operates continuously at a speed of 60 cycles per second as it is powered by the signal on line 24. However, in extreme circumstances when the signals on lines 18 and 22 are 180° out of phase and thereby cancel each other out, the DC servo motor 28 will not operate. The DC servo motor 28 is provided with a micro switch 30 connected to the rotating shaft of motor 28 for alternation between a closed position and an open position, as shown.

The DC servo motor 28 and micro switch 30 constitute a control gate. Micro switch 30 is connected at one contact to a 60 cycle AC line voltage input on line 32, and another of the contacts of micro switch 30 is connected to a line 34 leading into a 60 cycle AC low voltage line 36. Low voltage line 36 originates from the relatively high voltage input appearing on line 32. The line 36 is made at a lower voltage level by means of a resistance device 38.

Micro switch 30 vibrates between a closed position whereby the high voltage line 32 is connected to the low voltage line 36 via the line 34 and the contacts of switch 30, and an open position in which the high voltage line 34 is open with respect to the line voltage input on line 32 and, therefore, only the low voltage output on line 36 is applied to the induction drive motor 12. For purposes of describing the embodiment shown, the micro switch 30 is normally biased in the open position as shown by such switch 30 in FIG. 1. As is well known in the art of switching devices, the biasing of a switch contact in an open or closed position is ordinarily performed by a spring means, not shown, connected to or forming a part of the switching contact. The half-wave rectified control signal at the anode of diode 26 is a pulsating 60 cycle voltage which controls the gate, comprising the DC servo motor 28 and micro switch 30, which during a portion of certain cycles switches the high voltage line 32 into the low voltage line 36 via the line 34 and the contacts of micro switch 30. The DC servo motor 28 operates continuously at the 60 cycle line frequency, but the number of cycles in which the high voltage line 32 is switched into the low voltage line 36 by the micro switch 30 varies in accordance with the frequency mixed control signal produced on line 24. The high voltage line 32 is at a level which is too high to operate the induction drive motor 12 at a speed which achieves synchronism of the tape recorded signals with the line frequency signals, while the low voltage line 36 is too low to produce such synchronism. Depending on the frequency mixed signal, the average supply voltage to the induction drive motor 12 will vary between the high and low voltages in a manner which adjusts the speed of the induction drive motor 12 to produce synchronism of the tape signal frequency with the line frequency. However, under the most extreme condition in which the frequency signal from the tape 14 is 180° out of phase with the line frequency, then such signals, when mixed, will substantially cancel each other out and, consequently, the DC servo motor 28 will not be sufficiently activated to operate the micro switch 30 and such switch will come to rest at either the closed or open position, depending on the normal bias of the micro switch 30. Since, in the embodiment shown in FIG. 1, the unenergized DC servo motor 28 will not activate the micro switch 30 from its normally open position, the switch 30, under this 180° out of phase condition, will remain in its normally open position and, therefore, only the low voltage line 36 will be applied to the drive motor 12. This condition will cause a low voltage to be applied to the induction drive motor 12 which will slow down such motor 12 until the tape is driven at a speed at which the tape recorded frequency is synchronous with the line frequency. If the tape 14 is driven too slow, then the frequency mixed signal will cause the micro switch 30 to be closed during portions of a greater number of cycles, thereby increasing the time during which the high voltage line 32 is combined with the low voltage line 36. In this case, the average voltage applied to the induction drive motor 12 increases to thereby speed up the tape 14 until its recorded frequency signal is synchronous with the line frequency. On the other hand, if the tape is running too fast, the frequency mixed signal causes the micro switch to be closed during a smaller number of cycles, thereby reducing the average voltage applied to the induction drive motor 12. Here, the induction drive motor 12 will slow down to a speed in which the recorded frequency signal on the tape 14 is synchronous with the line frequency. As an example, the high voltage line might be at 117 volts, 60 cycles, while the low voltage line is at 85 volts, 60 cycles.

As shown in FIG. 1, the line voltage source applied on line 32 can be used as a reference frequency which is mixed at point 20 with the tape recorded output frequency on line 18. This is accomplished through the use of a transformer 40 which is connected at its primary side to receive the line voltage input on line 32, and connected on its secondary side to provide a 60 cycle line reference frequency on line 22. Of course, other suitable reference frequency sources than that shown can also be employed.

Referring to FIG. 2, there is shown a graphical representation of the voltage applied to the tape drive motor 12. As described previously, the DC servo motor 28 operates the micro switch 30 in a manner whereby the high voltage line 32 is switched into the low voltage line 36 via line 34. The low voltage line 36 leads directly into the induction drive motor 12. Line 36 is connected to the high voltage line 32 via a control gate 42 shown comprising the DC servo motor 28 and the micro switch 30. The 60 cycle AC signal wave form is generally represented by the numeral 44 and consists of a combination of high voltage portions 46 and low voltage portions 48. Actually, certain ones of the 30 cycles of the 60 cycle AC voltage shown, the micro switch 30 closes to cause a high voltage injection into the low voltage line 36. The duration of each high voltage injection is for only a fraction of a full cycle, since the contacts of the micro switch 30 can be at most activated on only the one side or polarity of a full cycle. Depending on the difference in phase between the tape recorded frequency on line 18 and the reference frequency on line 22, the number of high voltage cycles verses low voltage cycles will vary. The distances between points A and B represents one-half second of tape operation using 60 cycle voltage pulses. Here, the 60 cycle pulses have been supplied with the high voltage injections during 19 times out of a possible 30 cycles of the half second of operation. This is indicated by the dots 50 marked along the line 36. The average voltage supplied on lines 36 and 36' to the induction drive motor 12 is of the correct magnitude so as to drive such motor at a speed which causes the magnetic tape 14, and thus the recorded frequency pulses on such tape 14, to run synchronous with the reference or line frequency. It can be seen that the alternation between the low voltage and the high voltage is necessarily irregular in order to compensate for the fractional dimensional stability and tape slippage associated with non-sprocketed magnetic tape drive systems.

It also can be seen that this alternation between the low voltage and the high voltage induces the drive motor 12 to react in a similar manner to a standard synchronous motor in that its rotation, while appearing to be smooth due to the momentum of the rotor is, in fact, pulsing in phase and in synchronism with the tape pulses. The high voltage provides pulsating strength at each instant of insertion, thus causing the drive motor 12 to phase with the line frequency regardless of the position of the poles on the rotor and at the same time causing the recorded tape pulses to phase with the line frequency as well.

It should also be understood that the reason the system reacts so quickly in achieving synchronism between the tape frequency and the line frequency is that it contains reserve power capacity far in excess of the power necessary to drive the motor 12 at synchronous speed. If, for instance, the motor 12 requires one-half ampere under normal running conditions, any attempt to force the tape and its recorded signal out of phase with the line frequency would result in a surge of power from the high voltage line of up to several amperes, thus instantly forcing the motor to return the tape pulse to its original phase.

Figure 3:
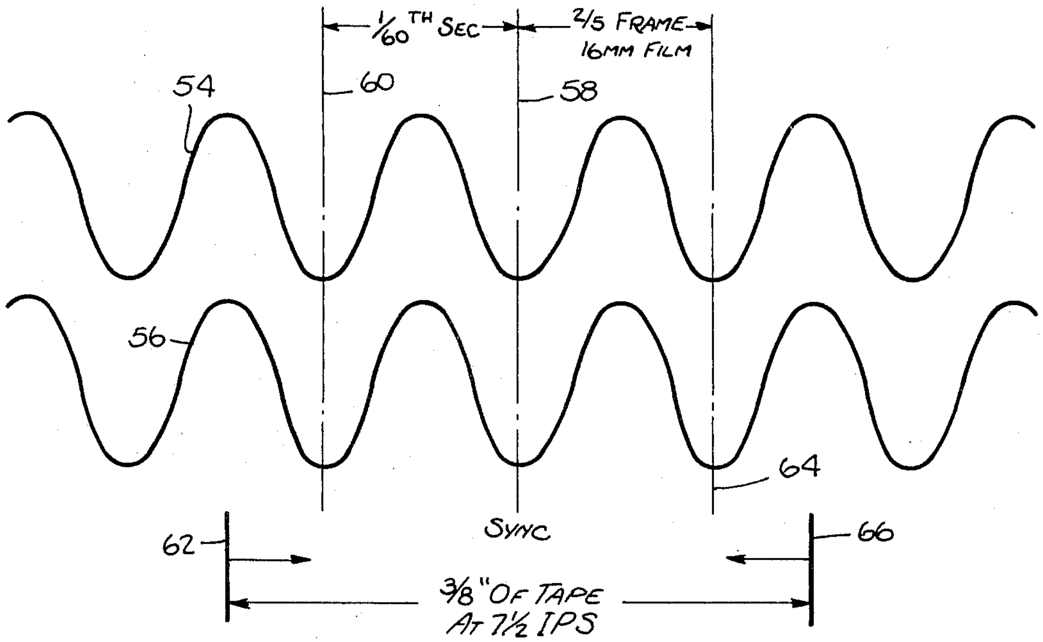
FIG. 3 shows an electric signal diagram of the frequency signals played back from both sprocketed and non-sprocketed tape machines, illustrating the manner by which the motor speed control device overcomes tape slippage and achieves synchronism between the machines.

Referring to FIG. 3, two wave forms 54 and 56 of two tracks of information on a sprocketed machine and a non-sprocketed tape machine, respectively. The motor speed control device shown in FIG. 1 is employed in an interlock arrangement between the sprocketed machine and the non-sprocketed tape machine. The machines are mechanically locked together via their drive motors in the stopping and starting operations only, by the use of a magnetic clutch, not shown. After the two machines have reached operating speed after starting, the magnetic clutch is released, thereby releasing the interlock between such drive motors and permitting the motor speed control device of the present invention to govern the speed of induction drive motor for the non-sprocketed tape machine in accordance with the recorded frequency signals on the tape recorder. The sprocketed machine runs synchronous to the line by means of a synchronous motor. During starting and stopping of the magnetic tape recorder, the tape is often caused to be placed out of synchronism with other sprocketed machines used in the same system. To illustrate this, the vertical line 58 represents a point in time at which synchronism is between the track 54 and the track 56 of two machines. The tracks 54 and 56 are shown with their information signals in synchronism during a running or operating condition of a sprocketed and a non-sprocketed machine, respectively. However, when the two machines are stopped together in the interlock arrangement described above, the non-sprocketed tape associated with track 56 may come to rest in a position wherein a vertical reference line 60 is shifted to the left to a time position somewhere between the line 60 and a position indicated by a vertical line 62. Alternately, the non-sprocketed tape can cause the track 56 to shift a vertical line 64 to the right to the position indicated by a line 66 or somewhere between the positions shown by lines 64 and 66. In re-starting the machines, however, the motor speed control device of the present invention automatically corrects the above-described error in synchronism by re-phasing the tape recorded frequency pulse to the line frequency pulse once the machines have reached normal operating speed and the interlock device is released.

As an example of the operation illustrated in FIG. 3, 2/5 of a frame of 16mm film is located between the vertical lines 58 and 64, and ⅜ inches of tape moving at a normal speed of 7 ½ inches per second is located between the vertical lines 62 and 66, shown. Also, 1/60 of a second of tape passage at a speed of 7 ½ inches per second is represented between the points 58 and 60, amounting to ⅛ inches of tape. The motor speed control device of the present invention automatically corrects any error up to 1/5 of a frame in either direction, thereby preventing an accumulation of error from repeated stops and starts of the tape. The motor speed control device is designed to correct such errors through the control of the AC current supplied to the AC induction drive motor. The controlling action provided by the AC supply voltage is such that the two tracks 54 and 56 always seek synchronism in the same phase. For example, movement of the track 54 beyond the line 62 or the line 66 would result in shifting the line 58 to the points at either lines 60 or 64, these points being the next in-phase points. This would place the tracks out of sync by 2/5 of a frame, or ⅛ inch of tape running at 7 ½ inches per second. However, since it is believed that the average error in starting or stopping a tape is about 1/32 of an inch, then the motor speed control device can operate within the same phase and will not seek out the next pulse with which to lock in phase. Consequently, the system rephases itself to correct this error and produce synchronism every time the machines start and reach the proper speed. As a result, accumulation of error is avoided.

Thus, it can be seen that the subject motor speed control device disclosed with respect to the FIGS. 1–3 for controlling non-synchronous induction motors causes an otherwise non-synchronous machine, whether in interlock or not, to be almost instantaneously phase-corrected to run in synchronism with a line frequency and therefore also in synchronism with all other synchronous machinery. The subject motor speed control device can also be employed to cause 2, 3 or more non-synchronous machines to run either in step with each other, and non-synchronous to the line frequency, or in step with each other and interlocked with the line frequency, thereby providing versatile operation. In addition, the subject motor speed control device is realtively simple and inexpensive to manufacture, maintain and repair, if necessary.

Figure 4:
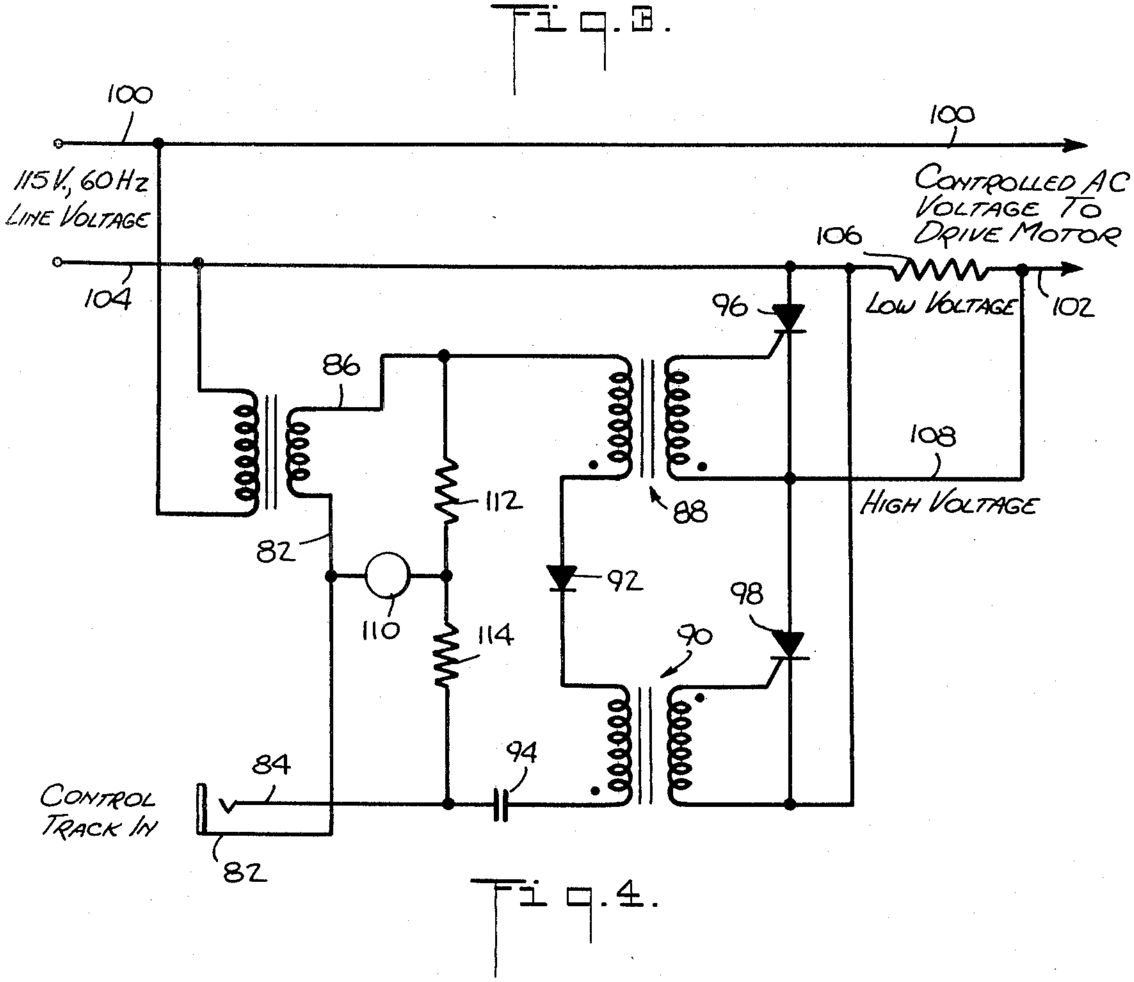
FIG. 4 shows another embodiment of the invention including a thyristor circuit replacing the electromechanical device used with the circuit shown in FIG. 1.

Referring to FIG. 4, there is shown another embodiment of the motor speed control device wherein essentially a thyristor gate circuit replaces the electromechanical gate shown in FIG. 1, comprising the DC servo motor 28 and the micro switch 30. Specifically, the recorded frequency signal is played back from the tape and supplied on lines 82 and 84 and mixed with a reference signal applied on lines 82 and 86. The mixing of the tape frequency and the reference frequency takes place in the network consisting of the primaries of two transformers 88 and 90 which are used to control the gates of two thyristors 96 and 98. As shown in FIG. 4, the primaries of the two transformers 88 and 90 are connected in a series arrangement together with a diode 92 and a capacitor 94. This network produces the modulating control voltage signal which appears in the secondary windings of the transformers 88 and 90. The diode 92, aside from its purpose of half wave rectifying the signal, has the function, in combination with the capacitor 94 of a non-linear control by varying the reactance of each transformer 88 and 90 as seen by the gates of the thyristors 96 and 98. The effect of this non-linear control is to smooth out the overall balance of the system and to avoid lag and overdrive in the tape drive motor. The gates act in a similar manner as the micro switch 30, feeding the proper frequency of high voltage injections to the low voltage lines 100 and 102 connected to drive motor 12 to cause it to drive the tape and its recorded frequency synchronous to the reference frequency. Thyristors 96 and 98, it can be noted, are connected in reverse polarity, each handling a half wave in an alternating pattern. Each of the gates of the thyristors 96 and 98 are connected to one side of each of the secondary windings of the transformers 88 and 90. The other side of the transformer secondaries are connected to a pair of resistor 106 bypass circuits of the thyristors 96 and 98. The bypass circuit for thyristor 96 can be traced from its anode side on line 104 to the resistor 106 connection at line 102. The bypass circuit for thyristor 98 can be traced from line 102 at the anode side of thyristor 98 to the resistor 106 connection at line 104. Line 108 is common to both circuits and carried alternating high voltage pulses to the tape drive motor.

The 115 volt, 60 cycle line voltage supplied on lines 100 and 104 is attenuated to a lower amplitude voltage by a resistance device 106. The high voltage injections are provided through a line 108 connected to the line 102. A VU meter circuit, consisting of a meter 110 and two resistances 112 and 114, provides a visual check on the operation of the device. In normal synchronous operation, the VU meter will show no fluctuation but should a retard or advance switch, not shown, be turned on, the meter will fluctuate at a rate which is in direct proportion to the switched in desired rate of gain or loss in relation to the reference frequency.

Although the above description is directed to preferred embodiments of the invention, it is noted that other variations and modifications will be apparent to those skilled in the art and, therefore, may be made without departing from the spirit and scope of the present disclosure. For example, while the motor speed control system described hereinabove operates with a magnetic tape recorder, such system can also be used in applications where it is desired to have non-synchronous induction motors run in synchronism with either a line reference frequency or a synchronous machine.

What is claimed is:

1. A system for controlling the speed of a non-sprocketed tape machine driving a tape having a known frequency signal recorded thereon, comprising:

a non-synchronous alternating current induction motor for driving said tape;

means for producing a speed reference frequency signal;

means for detecting said recorded frequency signal on said tape as it is driven by said induction motor;

means for mixing said detected recorded frequency signal with a reference frequency signal to produce said speed control signal, the amplitude of which varies in relation to the phase difference between said two frequency signals;

alternating voltage power supply means for driving said induction motor, said power supply means providing a high voltage line and relatively low voltage line; and a DC servo motor means connected between said power supply means and said mixing means and operated by said control signal, said DC motor means having its shaft connected to an electrical contact switch for switching said high voltage line into said low voltage line and thereby alternating the voltage supplied for driving said induction motor between said high voltage which induces said induction motor to rotate faster than desired and said relatively low voltage which induces said induction motor to rotate slower than desired, in accordance with the phase relation between said mixed frequency signals, said high and low voltages occurring at a frequency which is equal to and controlled by the reference frequency;

whereby the voltage supplied to said induction motor will alternate between said high and low voltages in a manner such that the percentage of high voltage pulses to low voltage pulses will cause said induction motor to rotate at a speed which achieves synchronism of the tape recorded frequency signal and said reference frequency signal.

2. System as recited in claim 1, wherein said high voltage line and said low voltage line originate from the same alternating current source, said low voltage line being continuously connected to said induction motor while said high voltage line is connected by said DC servo motor means and its electrical contact switch to said induction motor only during certain cycles, whereby the number of injections of high voltage supplied to said induction motor will vary in response to the phase relation between said frequency signalS in a manner which corrects for phase lags and phase leads and thereby achieves synchronism of said tape recorded frequency and said reference frequency.

3. A system for controlling the speed of a non-synchronous AC induction motor in accordance with a desired reference frequency signal, comprising:

means for generating an alternating current signal, the frequency of which is in direct relationship with the speed of said induction motor;

means for producing a speed reference frequency signal;

means for mixing said generated alternating current signal with said reference frequency signal to produce a control signal, the amplitude of which varies in relation to the phase relation difference between said two frequency signals;

alternating voltage power supply means for driving said induction motor, said power supply means providing a high voltage line and a relatively low voltage line; and a DC servo motor connected between said power supply means and said mixing means and operated by said control signal, said DC motor means having its shaft connected to an electrical contact switch for switching said high voltage line into said low voltage line and thereby alternating the voltage supplied for driving said induction motor from said high voltage which induces said induction motor to rotate faster than desired to said relatively low voltage which induces said induction motor to rotate slower than desired, said high and low voltages occurring at a frequency equal to said reference frequency;

whereby the voltage supplied to said induction motor will alternate between said high and low voltages in a manner such that the percentage of high voltage pulses to low voltage pulses will cause said induction motor to rotate in synchronism with said reference frequency signal.

* * * * *